March 25, 1952 V. F. DALE ET AL 2,590,759
ROTARY SEAL
Filed July 3, 1950

INVENTORS
V. F. Dale
BY G. Reed
Lieber & Lieber
ATTORNEYS.

Patented Mar. 25, 1952

2,590,759

UNITED STATES PATENT OFFICE 2,590,759

ROTARY SEAL

Vernon F. Dale and George Reed, Onalaska, Wis., assignors to The Bump Pump Co., La Crosse, Wis., a corporation of Wisconsin Application July 3, 1950, Serial No. 171,894

3 Claims. (Cl. 286—11.13)

This invention relates in general to improvements in assemblages for preventing leakage of fluid past relatively fixed and rotatable coacting members which normally confine the fluid, and relates more specifically to improvements in the construction and operation of so called rotary seals especially of the type disclosed in our copending application Serial No. 151,892, filed March 25, 1950.

The primary object of our present invention is to provide an improved rotary seal which is simple in construction and efficient in operation.

In our prior application above identified we have disclosed an improved rotary seal adapted for application between relatively fixed and rotatable members and comprising a pair of relatively rotatable rigid metal rings interposed between the members and contacting each other along adjoining flat end surfaces disposed transversely of the axis of rotation, each ring having an opposite annular inclined or tapered surface, and a continuous rubber O-ring of circular cross-section coacting with the inclined surface of each metal ring and with an adjacent end surface of one of the members. While this previous sealing assemblage has proven highly satisfactory and successful for preventing leakage of non-corrosive liquids such as milk, it could not be effectively utilized to seal acid containing fluids which tend to deteriorate the rubber rings and the surfaces contacted thereby. The O-ring sealing unit moreover provides relatively limited contact at the flexible rings unless the pressure differential between the opposite sides of the seal is quite extensive.

It is therefore an important object of the present invention to provide an improved sealing assemblage which will effectively eliminate the above mentioned difficulties, and which may be utilized with acid containing liquids as well as alkaline fluids.

Another important object of this invention is to provide an improved flexible sealing ring for rotary seals of the above described type, which is more sensitive in action than the rubber O-rings formerly used.

A further important object of the invention is to provide an improved rotary ring unit which provides maximum sealing contact between the rings and the relatively rotatable members, and which may be effectively employed with pressure differentials acting in opposite directions.

Still another important object of our invention is to provide a simple, compact and durable rotary seal adapted for use under diverse conditions, and which may be quickly and conveniently assembled or dismantled.

These and other objects and advantages of the invention will be apparent from the following detailed description.

A clear conception of the features constituting our present improvement, and of the construction and functioning of several typical rotary seals embodying the same, may be had by referring to the drawing accompanying and forming a part of this specification wherein like reference characters designate the same or similar parts in the various views.

The gist of our present invention is the provision of an improved rotary seal between relatively rotatable fixed and movable members disposed one within the other and having spaced end surfaces and intervening coaxial annular surfaces, the seal comprising a pair of adjoining rigid metal rings confined between the member surfaces and having relatively rotatable flat contacting surfaces at their adjacent ends disposed transversely of the annular member surfaces, each of these rings also having an opposite tapered or inclined end surface facing the adjacent end member surface, and a relatively stiff but flexible sealing ring disposed between each of the inclined ring surfaces and the adjacent end member surface, each flexible sealing ring having a pair of relatively distortable annular flanges snugly cooperable with the adjacent inclined ring surface and with the adjacent annular member surface. While the invention has been shown and described as being advantageously applicable to the casings and shafts of rotary pumps, it is not our intention to unnecessarily restrict the utility of the improved features by virtue of this limited embodiment; and it is also contemplated that specific descriptive terms used herein be given the broadest possible interpretation consistent with the disclosure.

Figure 1:
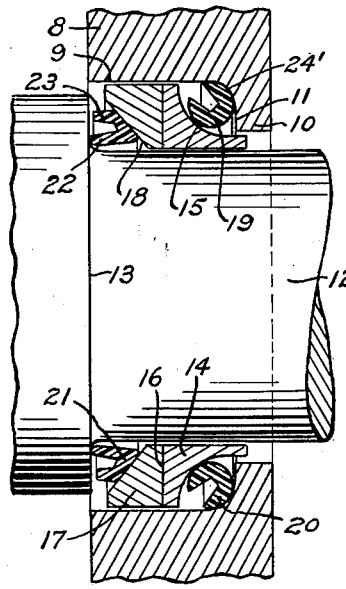
Fig. 1 is a central longitudinal section through one typical embodiment of the invention, showing the parts in neutral position with no pressure differential existing on opposite sides of the rotary seal.
Figure 2:
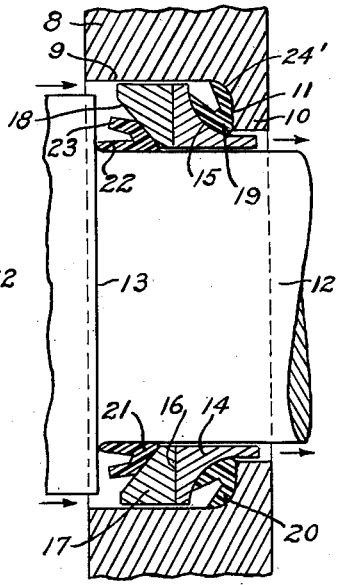
Fig. 2 is a similar but somewhat diagrammatic and distorted section showing the action of the seal of Fig. 1 when the pressure differential is acting toward the right.
Figure 3:
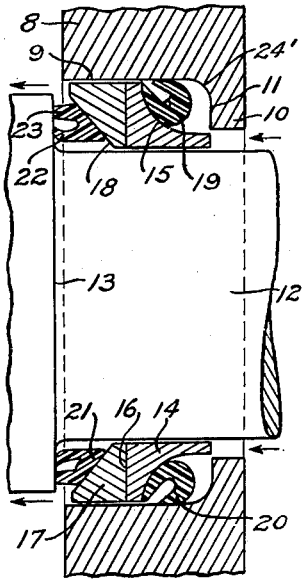
Fig. 3 is a similarly diagrammatic and distorted section showing the action of the sealing unit of Fig. 1 when the pressure differential is acting toward the left.

Referring to Figs. 1 to 3 inclusive of the drawing, the typical rotary seal disclosed therein comprises in general a normally stationary casing member 8 having a cylindrical bore 9 and an inwardly directed flange 10 provided with a transverse surface 11 at one end of the bore 9; a rotary shaft member 12 extending through but spaced from the casing bore 9 and flange 10 and having a transverse outwardly extending surface 13 at the opposite end of the bore 9 facing the casing surface 11; a non-rotary rigid metal ring 14 provided with an inclined surface 15 facing the casing surface 11, and snugly coacting along a flat transverse sealing surface 16 with a rigid rotary ring 17 provided with a tapered surface 18 facing the shaft surface 13, both rings 14, 17 being loosely confined between the bore 9 and the periphery of the shaft member 12; a relatively stiff but flexible ring 19 interposed directly between the inclined ring surface 15 and the fixed casing surface 11 and having relatively distortable annular flanges 20 formed thereon; and another relatively stiff but flexible ring 21 interposed between the tapered surface 18 and the revolving member surface 13 and having relatively distortable annular flanges 22 and 23 formed thereon.

The casing member 8 may be the housing of a chemical pump or the like, having its rotor or impeller carried by the shaft member 12, and these members 8, 12 as well as the continuous solid rings 14, 17 may be formed of acid and rust resistant metal or the like. The contact surface 16 of the fixed and rotary sealing rings 14, 17 is smooth and flat, preferably being disposed perpendicular to the common central axis of the bore 9 and shaft member 12, and, as shown, the inclined outer surface 15 of the fixed seal ring 14 is gradually curved, while the tapered inner surface 18 of the rotary seal ring 17 is frustro conical but may be likewise gradually curved. The coacting metal sealing rings 14, 17 while snugly and slidably engaging each other along the surface 16, have their outer and inner peripheral surfaces spaced slightly from the bore 9 and shaft periphery respectively, and they are also free to move in unison along the shaft axis.

The flexible sealing rings 19, 21 are formed of acid resistant distortable material such as plastic and the stator ring 19 is normally approximately circular in cross-section, while the rotor ring 21 is normally substantially trapezoidal in cross-section as shown in Fig. 1. The ring 19 has an annular recess therein which forms the resilient flanges 20 one of which is engageable with the adjacent fixed metal ring surface 15 and the other of which likewise engageable with either the casing bore 9 or the end surface 11 of the flange 10 and with the intervening curved casing surface 24', and when this ring 19 is pressed and distorted into snug engagement with these surfaces it holds the metal ring 19 against rotation. The other ring 21 also has an annular recess therein which forms the resilient flanges 22, 23 of which the flange 22 is engageable with the peripheral shaft member surface and with the end surface 13 while the other flange 23 is abuttable against the shaft end surface 13 alone, and when this ring 21 is distorted and pressed into snug engagement with these surfaces it causes the metal ring 21 to revolve with the rotary member 12.

During normal operation of the improved rotary seal of Figs. 1 to 3 inclusive, when the pressures on opposite sides of the casing member 8 are equal, the various sealing rings 14, 17, 19, 21 will assume the positions illustrated in Fig. 1, with the metal rings 14, 17 sealingly engaging each other along the flat surface 16 and the flexible ring 19 likewise engaging the ring 14 and the casing member 8 while the flexible ring 21 similarly but drivingly engages the other ring 17 and the shaft member 12. If higher pressure such as atmospheric pressure exists at the left of the casing member 8 and lower pressure such as vacuum is established at the opposite side of the casing, then the metal rings 14, 17 will tend to move slightly toward the right and the flexible rings 19, 21 with their resilient flanges 20, 22, 23 will automatically assume sealing positions as shown in exaggerated condition in Fig. 2. If lower pressure such as vacuum is established at the right of the fixed member 8 and higher pressure such as atmospheric pressure exists at the left of this member, then the metal rings 14, 17 will tend to move slightly toward the left and the flexible rings 19, 21 together with their resilient flanges 20, 22, 23 will automatically assume sealing positions as again shown in exaggerated condition in Fig. 3. The improved seal thus functions to automatically and positively prevent leakage of fluid past the assemblage in either direction.

Figure 4:
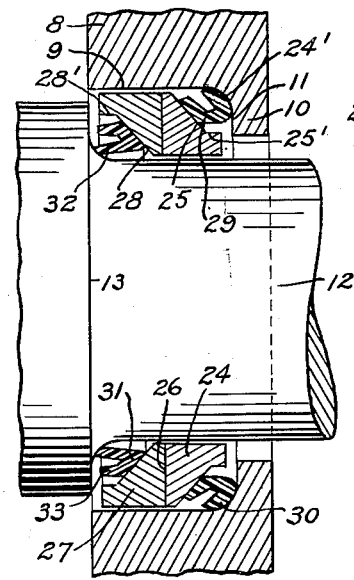
Fig. 4 is a central longitudinal section through another typical embodiment of the invention, again showing the parts in neutral position with no pressure differential existing on the opposite sides of the seal.
Figure 5:
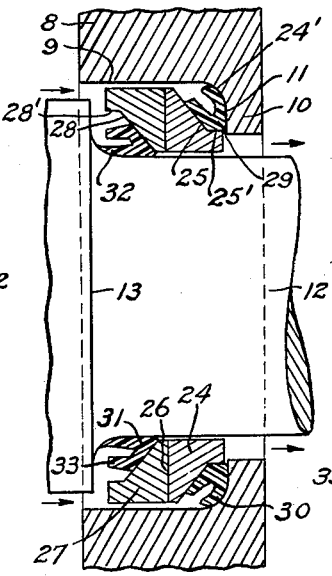
Fig. 5 is a similar but somewhat diagrammatic and distorted section showing the action of the seal of Fig. 4 when the pressure differential is acting toward the right.
Figure 6:
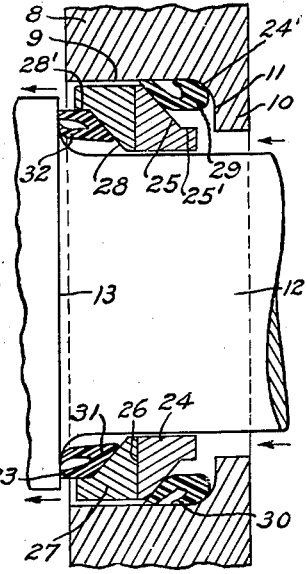
Fig. 6 is a similarly diagrammatic and distorted section showing the action of the sealing unit of Fig. 4 when the pressure differential is acting toward the left.

Referring to Figs. 4 to 6 inclusive of the drawing, the other typical rotary seal disclosed therein comprises in general a normally fixed casing member 8 having a bore 9 and flange 10 provided with surfaces 11, 24'; a rotary member 12 extending through the member 8 but being spaced from the bore 9 and flange 10, and having thereon a transverse surface 13 at the opposite end of the bore 9; a non-rotatable rigid metal ring 24 provided with a tapered surface 25 and with a cylindrical outer surface 25' facing the casing surface 11 and bore 9, and snugly coacting along a flat transverse sealing surface 26 with another rigid metal ring 27 provided with a tapered surface 28 and with an inner cylindrical surface 28' facing the shaft end surface 13 and periphery; a relatively stiff but flexible ring 29 interposed between the metal ring 24 and the casing member 8 and having relatively distortable resilient flanges 30 formed thereon; and another relatively stiff but flexible ring 31 interposed between the metal ring 27 and the shaft member 12 and having relatively distortable resilient flanges 32, 33 formed thereon.

The casing and shaft members 8, 12 of this second embodiment of the invention, may be the same as those previously described, but the sealing rings are of somewhat modified construction. The continuous metal rings 24, 27 of the modified assemblage snugly but slidably coact along the flat annular surface 26 which is disposed approximately perpendicular relative to the shaft axis, and the two rings have similar but reversed cross-sections each being provided with a frustro conical wedge surface and with a cylindrical surface intersecting tapered surface. The flexible sealing rings 29, 31 of the modified assemblage coact respectively with the non-rotary ring 24 and casing 8, and with the rotary ring 27 and shaft 12 and normally have cross-sections approximately as shown in Fig. 4; and under certain conditions of operation these distortable rings 29, 31 are adapted to snugly engage both the tapered surfaces 25, 28 and the cylindrical surfaces 25', 28' of the adjacent solid rings 24, 27.

During normal operation of the improved rotary seal of Figs. 4 to 6 inclusive, when the pressures on the opposite sides of the casing member 8 are equal, the various sealing rings 24, 27, 29, 31 will assume the positions illustrated in Fig. 4 with the metal sealing rings 24, 27 sealingly engaging each other along the flat surface 26 and the flexible ring 29 hugging the ring 24 and casing 8 while the other flexible ring 31 likewise engages the ring 27 and shaft 12. If higher pressure such as atmospheric pressure exists at the left of the member 8 and lower pressure such as vacuum is established at the opposite side of the casing, then the metal rings 24, 27 will tend to shift slightly toward the right and the rings 29, 31 will automatically assume sealing positions as shown somewhat exaggerated in Fig. 5. If low pressure such as vacuum is established at the right of the member 8 and higher pressure such as atmospheric pressure exists at the left of this member, then the metal rings 24, 27 will tend to move slightly toward the left and rings 29, 31 will asume the sealing positions shown in Fig. 6. It is to be noted, that in Fig. 5 the flexible ring 29 snugly engages both the outer tapered surface 25 and the cylindrical surface 25' of the adjacent solid ring 24, while in Fig. 6 the flexible ring 31 likewise engages both the inner tapered surface 28 and the cylindrical surface 28' of the adjacent solid ring 27, thus insuring most effective automatic sealing regardless of the direction of the pressure differential.

From the preceding detailed description it should be apparent that we have provided a rotary shaft seal which besides being simple and compact in structure is also highly efficient and automatic in operation, while being especially adapted to seal chemicals or other acid containing fluids. In both of the typical seals disclosed, the distortable plastic sealing rings function to permit free rotation of one of the solid rings while preventing rotation of the other, and additional sealing effect is produced by the modified assemblage of Figs. 4 to 6 inclusive by virtue of the formation of both of the solid rings with cylindrical surfaces merging into the frustro conical surfaces thereof. Both sealing units may be quickly assembled or dismantled for cleaning and inspection, and the improved seals may be produced in various sizes for diverse purposes. The formation of the flexible rings with resilient and distortable flanges makes these rings very sensitive to variations in pressure in either direction, and the annular sliding contact surface between the solid rings is the only surface subject to wear.

It should be understood that it is not our desire to limit this invention to the exact details of construction and operation of the typical rotary seals herein shown and described, for various modifications within the scope of the appended claims may occur to persons skilled in the art.

We claim:

1. In a rotary seal, a casing having a bore and an inwardly extending flange at one end of the bore, a shaft extending centrally through said bore and flange and having thereon an outwardly extending end surface substantially closing the end of said bore remote from said flange, a pair of rigid sealing rings loosely slidably confined within said bore and having adjoining sealingly engaging surfaces disposed transversely of the shaft axis, said shaft end surface and said rings being separated from said bore by annular clearance spaces and one of said rings having an outer tapered surface adjacent to said casing flange while the other has an inner tapered surface adjacent to said shaft end surface, a relatively stiff but flexible ring having distortable annular flanges cooperable with said casing flange and outer surface, and another relatively stiff but flexible ring interposed between said shaft end surface and said inner tapered surface and having distortable annular flanges cooperable with said shaft and inner surfaces, said flexible ring flanges being distortable by fluid passing through said clearance spaces.

2. In a rotary seal, a casing having a bore and an inwardly extending flange at one end of the bore, a shaft extending centrally through said bore and flange and having thereon an outwardly extending end surface substantially closing the end of said bore remote from said flange, a pair of rigid sealing rings loosely slidably confined within said bore and having adjoining sealingly engaging surfaces disposed transversely of the shaft axis, said shaft end surface and said rings being separated from said bore by annular clearance spaces and one of said rings having an outer tapered surface adjacent to said casing flange while the other has an inner tapered surface adjacent to said shaft end surface, a relatively stiff but flexible ring interposed between said flange and said outer tapered surface and having distortable annular flanges separated by an intervening recess and cooperable with said casing flange and outer surface, and another relatively stiff but flexible ring interposed between said shaft end surface and said inner tapered surface and having distortable annular flanges separated by an intervening recess and cooperable with said shaft and inner surfaces, both of said recesses facing said shaft end surface and said ring flanges being distortable by fluid passing through said clearance spaces.

3. In a rotary seal, a casing having a bore and an inwardly extending surface at one end of the bore, a shaft extending centrally through said bore beyond said end surface and having thereon an outwardly extending end surface substantially closing the end of said bore remote from said casing end surface, a pair of rigid sealing rings loosely slidably confined within said bore between said end surfaces and having adjoining sealingly engaging surfaces disposed perpendicular to the shaft axis, said shaft end surface and said rings being separated from said bore by annular clearance spaces and one of said rings having an outer annular tapered surface intersecting an outer cylindrical surface adjacent to said casing end surface while the other has an inner annular tapered surface intersecting an inner cylindrical surface adjacent to said shaft end surface, a relatively stiff but flexible ring interposed between said casing end surface and said outer tapered surface and having flanges distortable by fluid passing through both of said clearance spaces against said casing end and tapered surfaces, and another relatively stiff but flexible ring interposed between said shaft end surface and said inner tapered surface and having flanges distortable by fluid passing through one of said clearance spaces against said shaft and inner cylindrical surface.

VERNON F. DALE.
GEORGE REED.

REFERENCES CITED

The following references are of record in the file of this patent:

UNITED STATES PATENTS

| Number | Name | Date |
| --- | --- | --- |
| 1,862,887 | Durdin, Jr. | June 14, 1932 |
| 2,247,454 | Thomson | July 1, 1941 |
| 2,422,007 | Gilbert, Sr. | June 10, 1947 |

FOREIGN PATENTS

| Number | Country | Date |
| --- | --- | --- |
| 320,297 | Great Britain | Oct. 10, 1929 |